(12) United States Patent
Yao et al.

(10) Patent No.: US 8,470,211 B2
(45) Date of Patent: Jun. 25, 2013

(54) FERROELECTRIC CERAMIC MATERIAL WITH A LOW SINTERING TEMPERATURE

(75) Inventors: Kui Yao, Singapore (SG); Bee Keen Gan, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 627 days.

(21) Appl. No.: 11/404,195

(22) Filed: Apr. 13, 2006

(65) Prior Publication Data

US 2007/0241304 A1  Oct. 18, 2007

(51) Int. Cl.
*H01L 41/187* (2006.01)

(52) U.S. Cl.
USPC . 252/567; 252/505; 252/400.53; 252/400.51; 252/582; 252/507; 252/423; 501/134

(58) Field of Classification Search
USPC .................................. 252/62.9; 501/134, 135
See application file for complete search history.

(56) References Cited

U.S. PATENT DOCUMENTS 6,656,378 B2 * 12/2003 Kwon et al. ........... 252/62.9 PZ

FOREIGN PATENT DOCUMENTS

| JP | 63011523 | * | 7/1986 |
| JP | 02307825 | * | 5/1989 |
| JP | 04359809 | * | 12/1992 |

* cited by examiner

*Primary Examiner* — Melvin C Mayes
*Assistant Examiner* — Collette Nguyen
(74) *Attorney, Agent, or Firm* — Martine Penilla Group, LLP (57) ABSTRACT

The present invention provides new ferroelectric ceramic materials which can be sintered at a temperature lower than that of the conventional ferroelectric ceramic materials and upon sintering, devices formed of the new ferroelectric ceramic materials possesses excellent piezoelectric properties which are suitable for many industrial applications. The ferroelectric ceramic material includes a composition with a general formula of $wPb(Ni_{1/3}Nb_{2/3})O_3-xPb(Zn_{1/3}Nb_{2/3})O_3-yPb(Mg_{1/3}Nb_{2/3})O_3-zPbZrO_3-(1-w-x-y-z)PbTiO_3$, in which $0<w<1$, $0<x<1$, $0\leq y<1$, $0<z<1$, $w+x+y+z<1$, and $0.5\leq w+x+y$. A method of preparing a ferroelectric ceramic material includes preparing $MgNb_2O_6$, $ZnNb_2O_6$ and $NiNb_2O_6$ powder precursors, mixing the precursors with PbO, $TiO_2$ and $ZrO_2$ to form a mixture and calcining the mixture.

11 Claims, 9 Drawing Sheets

FERROELECTRIC CERAMIC MATERIAL WITH A LOW SINTERING TEMPERATURE

FIELD OF THE INVENTION

The present invention relates to ferroelectric materials. In particular, it relates to ferroelectric ceramic materials with a low sintering temperature.

BACKGROUND OF THE INVENTION

Ferroelectric ceramic materials are used in various industrial applications as dielectric media to produce electronic components or devices such as piezoelectric sensors, actuators, transducers, capacitors and pyroelectric sensors. During the manufacturing process of these devices, ferroelectric ceramic materials is are to undergo a sintering process at a high temperature. For example, at a temperature of about 1000° C. or higher. However, sintering at a high temperature significantly limits the application of ferroelectric ceramic material and leads to high manufacturing costs, and even cause device failures.

For example, in the manufacturing process of multilayer capacitors and actuators, dielectric layers made of ferroelectric ceramic materials are co-fired with the metal electrode layers laminated between the dielectric layers. To withstand the high sintering temperature, the electrode layers are required to possess excellent chemical inertness in oxygen ambient. Presently, the electrode layers are often made of precious metals such as Palladium-Silver (Pd—Ag) or Platinum (Pt). The cost of the electrode layers made of these precious materials is high, which can amounts to up to 80% of the total material costs of the multilayer devices. To stay competitive in the industry, manufacturers are continuously seeking every possibility to reduce the cost of the products they make, one approach of which is to use high silver-content alloy with reduced Pd amount to make the electrodes. However, this approach is difficult to implement because the high silver-content alloy and base metal cannot sustain the sintering temperature required for the conventional ferroelectric ceramic materials, when the sintering process is carried out in oxygen ambient.

In another example, piezoelectric devices are fabricated with ferroelectric ceramic thick films formed on a bottom electrode layer and substrate. During the fabrication process, the bottom electrode and substrate are to sustain a sintering temperature of about 1000° C. or higher. However, this sintering temperature will cause serious inter-diffusion and oxidation of the metal electrode layer and substrate, which may result in failure in the integration of a ferroelectric ceramic thick film on a metallized substrate. Therefore, a reduction in sintering temperature is highly desirable to improve the material and processing compatibilities for integrating a piezoelectric ceramic thick film, as well as to reduce lead evaporation during the sintering process.

Several approaches have been proposed to reduce the sintering temperature of ferroelectric ceramic materials. These approaches include liquid phase sintering, chemical doping, and use of nano-sized ceramic powders. While these approaches may reduce the sintering temperature, the properties of the ferroelectric ceramic devices, in particular the piezoelectric properties of the sintered material are seriously compromised. As such, ferroelectric ceramic materials prepared by these approaches may not satisfy the requirements for fabricating the electronic or electromechanical devices.

In view of the above, what is needed is to provide a ferroelectric ceramic material that may be sintered at a lower temperature and in the meantime, possesses the desired properties suitable for fabricating electronic or electromechanical devices. However, an ideal this type of ferroelectric ceramic material is currently unavailable.

SUMMARY OF THE INVENTION

The present invention provides new ferroelectric ceramic materials which can be sintered at a temperature lower than that of the conventional ferroelectric ceramic materials and upon sintering, devices formed of the new ferroelectric ceramic materials possesses the desired piezoelectric properties which are suitable for many industrial applications. Examples of these applications are, bulk ferroelectric ceramics, ferroelectric ceramic thick films and ferroelectric multilayer ceramic devices.

In accordance with a first aspect of the present invention, there is provided a ferroelectric ceramic material which includes a composition with a general formula of $wPb(Ni_{1/3}Nb_{2/3})O_3$ -$xPb(Zn_{1/3}Nb_{2/3})O_3$ -$yPb(Mg_{1/3}Nb_{2/3})O_3$ -$zPbZrO_3$ -$(1-w-x-y-z)PbTiO_3$, in which $0<w<1$, $0<x<1$, $0<y<1$, $0<z<1$, $w+x+y+z<1$, and $0.5 \leq w+x+y$.

Preferably, $w=0.10$ to $0.45$, $x=0.10$ to $0.35$, $y=0$ to $0.15$, and $z=0.10$ to $0.15$.

The ferroelectric ceramic material may further include an oxide of valence 2 metal element represented by a general formula of $A^{2+}O$. According to embodiments of the present invention, $A^{2+}O$ may be PbO, MgO, ZnO or NiO or combinations thereof.

In accordance with a second aspect of the present invention, there is provided a method for preparing a ferroelectric ceramic material, which may be used for fabricating electronic components or devices with a sintering temperature lower than that of the conventional ferroelectric ceramic material. Upon sintering, devices formed of the ferroelectric ceramic materials prepared according to embodiment of the present invention possess excellent piezoelectric properties. Devices fabricated thereof are suitable for many industrial applications including, for examples, bulk ferroelectric ceramics, ferroelectric ceramic thick films and ferroelectric multilayer ceramic devices.

According to one embodiment, firstly, $MgNb_2O_6$, $ZnNb_2O_6$ and $NiNb_2O_6$ powder precursors are prepared. $MgNb_2O_6$ may be prepared by mixing MgO and $Nb_2O_5$. $ZnNb_2O_6$ may be prepared by mixing ZnO and $Nb_2O_5$. $NiNb_2O_6$ may be prepared by mixing NiO and $Nb_2O_5$. Thereafter, the precursors are mixed with PbO, $TiO_2$ and $ZrO_2$ to form a mixture. The mixture are then dried and calcined, to form the ferroelectric ceramic material.

According to one embodiment, during mixing of the $MgNb_2O_6$, $ZnNb_2O_6$ and $NiNb_2O_6$ powder precursors with the PbO, $TiO_2$ and $ZrO_2$, an excess amount of oxides of valence 2 metal elements, for example MgO of 1% in mole, may be added. Addition of the excess amount of oxides of valence 2 metal elements helps promote the formation of perovskite phase and suppress the formation of pyrochlore phase in the ferroelectric ceramic material.

Ferroelectric ceramic materials according to embodiments of the present invention may be used to fabricate electronic devices in many industry applications. The sintering temperature is successfully reduced to a level suitable for the low cost Ag-based electrodes. In the meantime, electronic devices fabricated from the ferroelectric ceramic materials according to embodiments of the present invention possess advantageous physical, electrical and chemical properties.

Other aspects and advantages of the present invention will become apparent from the following detailed description, taken in conjunction with the accompanying drawings, illustrating by way of example the inventive concept of the present invention.

BRIEF DESCRIPTION OF THE DRAWINGS

These and other aspects and advantages of the present invention will be described in detail with reference to the accompanying drawings, in which.

DETAILED DESCRIPTION OF THE PREFERRED EMBODIMENTS

Table 1 below shows compositions of ferroelectric ceramic material samples illustrated in Examples 1 to 5 according to embodiments of the present invention. These compositions have the general formula:

$$wPNN\text{-}xPZN\text{-}yPMN\text{-}zPZ\text{-}(1-w-x-y-z)PT$$

where PNN is Lead Nickel Niobate, $Pb(Ni_{1/3}Nb_{2/3})O_3$; PZN is Lead Zinc Niobate, $Pb(Zn_{1/3}Nb_{2/3})O_3$; PMN is Lead Magnesium Niobate, $Pb(Mg_{1/3}Nb_{2/3})O_3$; PZ is Lead Zirconate, $PbZrO_3$; and PT is Lead Titanate, $PbTiO_3$. In these compositions, w is selected between 0.1 to 0.45, x is selected between 0.1 to 0.35, y is selected between 0 to 0.15, and z is selected between 0.1 to 0.15.

TABLE 1

| Composition | w<br>PNN | x<br>PZN | y<br>PMN | z<br>PZ | 1−w−x−y−z<br>PT |
|---|---|---|---|---|---|
| C1 | 0.45 | 0.10 | 0 | 0.13 | 0.32 |
| C2 | 0.40 | 0.10 | 0.10 | 0.12 | 0.28 |
| C3 | 0.30 | 0.10 | 0.10 | 0.15 | 0.35 |
| C4 | 0.20 | 0.20 | 0.10 | 0.15 | 0.35 |
| C5 | 0.10 | 0.35 | 0.15 | 0.10 | 0.30 |

Table 2 below shows a summary of the properties of compositions C1 to C5 of Table 1, after these compositions are sintered at different temperatures. The properties include density, dielectric constant, Curie temperature, remnant polarization, and piezoelectric constant $d_{33}$.

TABLE 2

| Composition | Sintering Temperature (° C.) | Bulk Density (g/cm³) | Dielectric Constant, K at 1 kHz | Remnant Polarization at 25 kV/cm (µC/cm²) | Curie Temperature at 1 kHz (° C.) | Piezoelectric constant, $d_{33}$ (pC/N) |
|---|---|---|---|---|---|---|
| C1 | 750 | 7.75 | 1631 | 3.335 | 145 |  |
|  | 800 | 7.87 | 2403 | 6.707 |  | 151 |
|  | 850 | 7.81 | 2655 | 8.652 |  | 160 |
|  | 900 | 7.72 | 2900 | 10.085 |  | 164 |
|  | 950 | 7.60 | 3181 | 11.567 |  | 106 |
| C2 | 800 | 7.42 | 2578 | 6.808 | 139 | 122 |
|  | 830 | 7.68 | 2807 | 7.893 |  | 123 |
|  | 850 | 7.65 | 2954 | 8.608 |  | 140 |
|  | 900 | 7.63 | 2999 | 9.988 |  | 158 |
|  | 950 | 7.59 | 3126 | 11.670 |  | 126 |
| C3 | 800 | 6.46 | 1213 | 4.291 | 183 | 123 |
|  | 830 | 7.55 | 1188 | 5.356 |  | 137 |
|  | 850 | 7.63 | 1693 | 7.285 |  | 138 |
|  | 900 | 7.52 | 2233 | 12.249 |  | 266 |
|  | 950 | 7.26 | 1955 | 13.581 |  | 376 |
| C4 | 800 | 6.87 | 1344 | 6.583 | 219 | 158 |
|  | 830 | 7.52 | 1456 | 8.506 |  | 183 |
|  | 850 | 7.59 | 1585 | 9.893 |  | 220 |
|  | 900 | 7.58 | 1900 | 13.907 |  | 357 |
|  | 950 | 7.57 | 1771 | 15.290 |  | 192 |
| C5 | 800 | 6.76 | 597 | 1.050 | 242 | 54 |
|  | 830 | 7.31 | 1274 | 3.338 |  | 131 |
|  | 850 | 7.67 | 1507 | 5.620 |  | 184 |
|  | 900 | 7.63 | 1842 | 10.555 |  | 393 |
|  | 950 | 7.58 | 2238 | 15.730 |  | 315 |

Table 3 below shows a summary of the properties of a modified composition C5-M, in which an excess MgO of 1% in mole is introduced.

TABLE 3

| Composition | Sintering Temperature (° C.) | Bulk Density (g/cm$^3$) | Dielectric Constant, K at 1 kHz | Remnant Polarization at 25 kV/cm (μC/cm$^2$) | Curie Temperature at 1 kHz (° C.) | Piezoelectric constant, $d_{33}$ (pC/N) |
|---|---|---|---|---|---|---|
| C5-M | 800 | 7.58 | 1938 | 6.489 | 200 | 209 |
| | 830 | 7.69 | 2024 | 8.100 | | 248 |
| | 850 | 7.81 | 2199 | 10.442 | | 266 |
| | 900 | 7.93 | 2213 | 12.833 | | 325 |
| | 950 | 7.88 | 2295 | 17.192 | | 360 |

Examples 1 to 5 are described below to illustrate the preparation method of ferroelectric ceramic material compositions shown in Table 1, according to embodiments of the present invention.

EXAMPLE 1

Figure 1A:
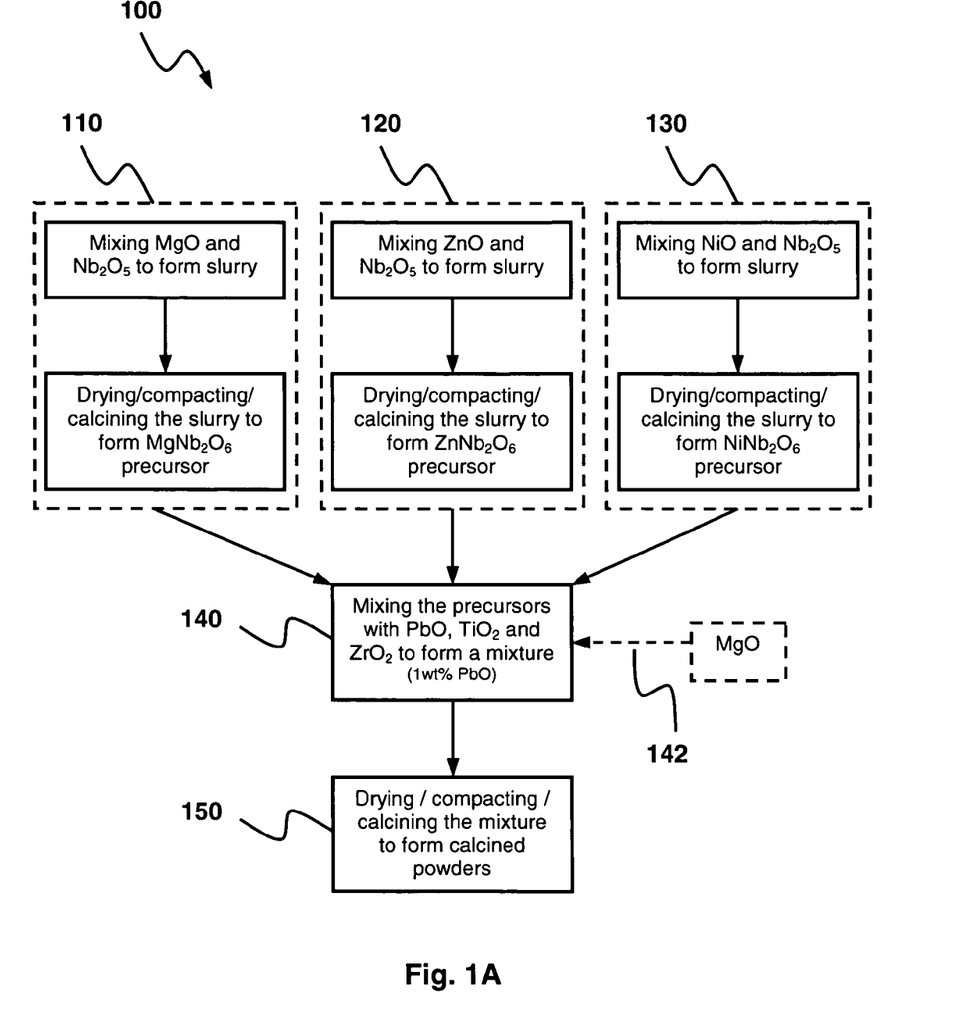
FIG. 1A is a flow chart showing a method for preparing a ferroelectric ceramic material according to one embodiment of the present invention.

As illustrated in FIG. 1A, a preparation method 100 of the ferroelectric ceramic material of composition C5 with the composition as specified in Table 1 (0.10PNN-0.35PZN-0.15PMN-0.10PZ-0.30PT) starts from the synthesis of MgNb$_2$O$_6$ (MNO), ZnNb$_2$O$_6$ (ZNO) and NiNb$_2$O$_6$ (NNO) powder precursors.

To prepare MNO powder precursors, as shown in block 110, stoichiometric amount of high purity starting oxides, MgO (Kanto Chemical, 99.99%) and Nb$_2$O$_5$ (Kanto Chemical, 99.95%) are mixed in ethanol using a planetary ball mill for 24 hours, in an agate container with agate balls as the grinding media. The milled powders are then dried at 70° C. and collected through a 45 μm sieve. These powders are compacted and calcined at a temperature of 950° C. to 1050° C., for example about 1000° C., for 2 hours to form single columbite phase according to the X-Ray Diffraction (XRD) result (not shown). The calcined powders are then crushed and milled in ethanol for 8 hours using the same agate container and milling balls. The powders are then dried overnight at 70° C., and collected through a 90 μm sieve.

To prepare ZNO powder precursors, as shown in block 120, stoichiometric amount of high purity starting oxides, ZnO (Kanto Chemical, 99.95%) and Nb$_2$O$_5$ (Kanto Chemical, 99.95%) are mixed in ethanol using a planetary ball mill for 24 hours, in an agate container with agate balls as the grinding media. The milled powders are then dried at 70° C. and collected through a 45 μm sieve. These powders are compacted and calcined at a temperature of 750° C. to 950° C., for example about 800° C., for 2 hours to form single columbite phase according to the XRD result (not shown). The calcined powders are crushed and then milled in ethanol for 8 hours using the same agate container and milling balls. The powders are then dried overnight at 70° C. and collected through a 90 μm sieve.

To prepare NNO powder precursors, as shown in block 130, stoichiometric amount of high purity starting oxides, NiO (Aldrich, 99.00%) and Nb$_2$O$_5$ (Kanto Chemical, 99.95%) are mixed in ethanol using a planetary ball mill for 24 hours in an agate container with agate balls as the grinding media. The milled powders are then dried at 70° C. and collected through a 45 μm sieve. These powders are compacted and calcined at a temperature of 950° C. to 1050° C., for example about 1000° C., for 4 hours to form single columbite phase according to the XRD result (not shown). The calcined powders are crushed and then milled in ethanol for 8 hours using the same agate container and milling balls. The powders are then dried overnight at 70° C. and collected through a 90 μm sieve.

For the phase synthesis of C5, stoichiometric amounts of various oxides PbO (Kanto Chemical, 99.90%), TiO$_2$ (Kanto Chemical, 99.90%) and ZrO$_2$ (Kanto Chemical, 99.90%), together with the pre-synthesized columbite powder precursors MNO, ZNO and NNO and an excess of 1% of PbO by weight are mixed through a ball milling process for 24 hours, as shown in block 140. The ball milling process is conducted in ethanol using a planetary mill with an agate container and agate balls as the grinding media. Upon completion of the milling process, the powders are dried (block 150), compacted and calcined at 800° C. for 30 minutes in a covered crucible to form the calcined powders.

Figure 1B:
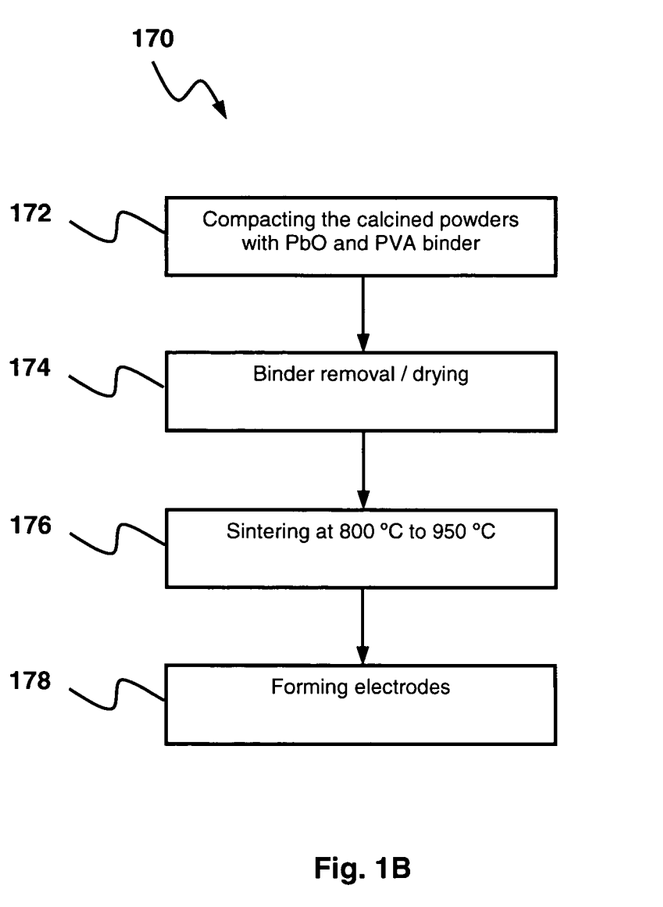
FIG. 1B is a flow chart showing a method for fabricating a device formed of a ferroelectric ceramic material according to one embodiment of the present invention.

FIG. 1B shows a process 170 for the fabrication of the test samples from the ferroelectric ceramic material. The calcined powders with C5 composition are compacted (block 172) into pellets in a mold, together with another 1% by weight excess PbO and 5 wt % PVA (polyvinyl alcohol) binder. After the organic binder is removed at 400° C. (block 174), the pellets are sintered in air at a temperature from 800° C. to 950° C. for one hour (block 176).

After the surfaces of the sintered pellets at various temperatures are polished, silver paste is applied on the two opposite surfaces, and fired at 520° C. to form electrode layers to form the test samples for electrical testing.

The properties of the test samples are investigated as illustrated below. The densities are evaluated based on the Archimedes principle. Ferroelectric hysteresis loops are characterized with an applied electric field from 5 to 30 kV/cm. The dielectric properties are measured using an impedance analyzer from 100 Hz to 1 MHz at room temperature. In addition, the temperature dependences of the dielectric properties for the samples sintered at 900° C. are examined from room temperature to 350° C., at several frequencies from 100 Hz to 100 kHz. Before the measurement of piezoelectric properties, the test samples are poled under an electric field of 25 kV/cm for 20 minutes at 125° C. in silicone oil. Then, the piezoelectric coefficients $d_{33}$ is measured with a piezoelectric $d_{33}$ meter at a vibration frequency of 110 Hz.

Figure 2:
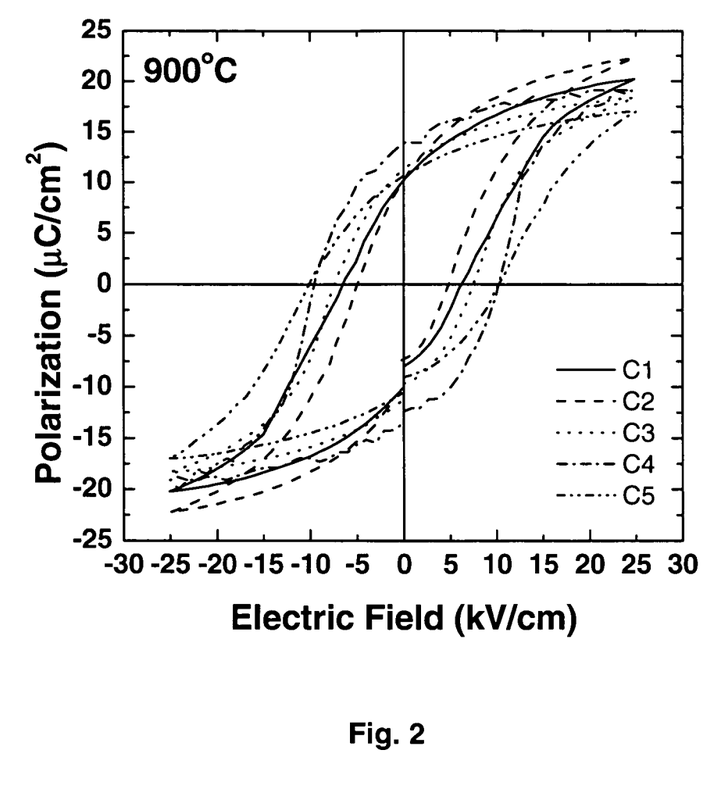
FIG. 2 is a chart showing a Polarization-Electric Field curve of a test sample formed of a ferroelectric ceramic material according to one embodiment of the present invention.
Figure 4:
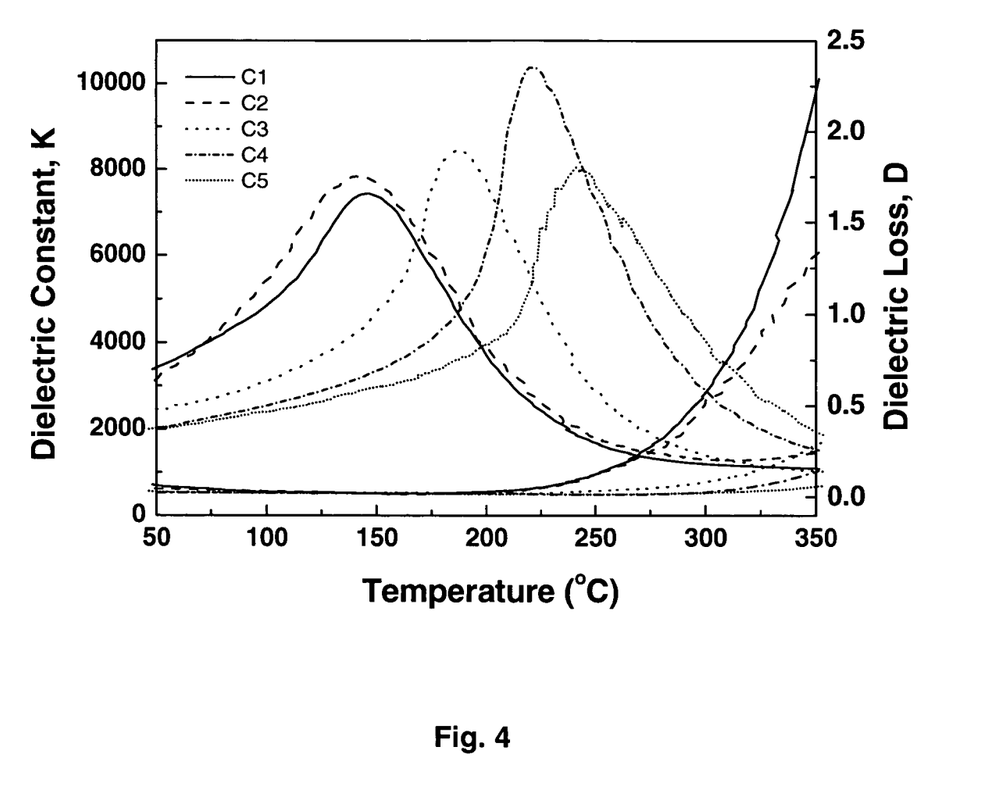
FIG. 4 is a chart showing a Dielectric Constant and Dielectric loss-Temperature curve of a test sample formed of a ferroelectric ceramic material according to one embodiment of the present invention.

XRD results exhibit single perovskite phase in C5, when the sintering temperature is above 830° C. From the experimental data for C5 as summarized in Table 2, this composition is sintered to its maximum density 7.67 g/cm$^3$ at 850-900° C. Higher sintering temperature of 950° C. leads to a slight decline in density due to a slight loss of lead content. Dielectric constant and remnant polarization increase with the sintering temperature from 800° C.-950° C., accompanied by the improved crystallinity and grain growth. With a sintering temperature of 900° C., the dielectric constant and remnant polarization are 1842 (1 kHz) and 10.6 μC/cm² (as shown in FIG. 2), respectively. The dielectric loss for all the samples is generally below 4% around room temperature. The piezoelectric coefficient $d_{33}$ for C5 after sintering at 900° C. is 393 pC/N. Temperature dependence of the dielectric constant indicates that this composition has a Curie temperature of 242° C., as shown in FIG. 4.

EXAMPLE 2

Another composition C4 as specified in Table 1 (0.20PNN-0.20PZN-0.10PMN-0.15PZ-0.35PT), may be produced through the same processing route as described in Example 1.

Figure 3:
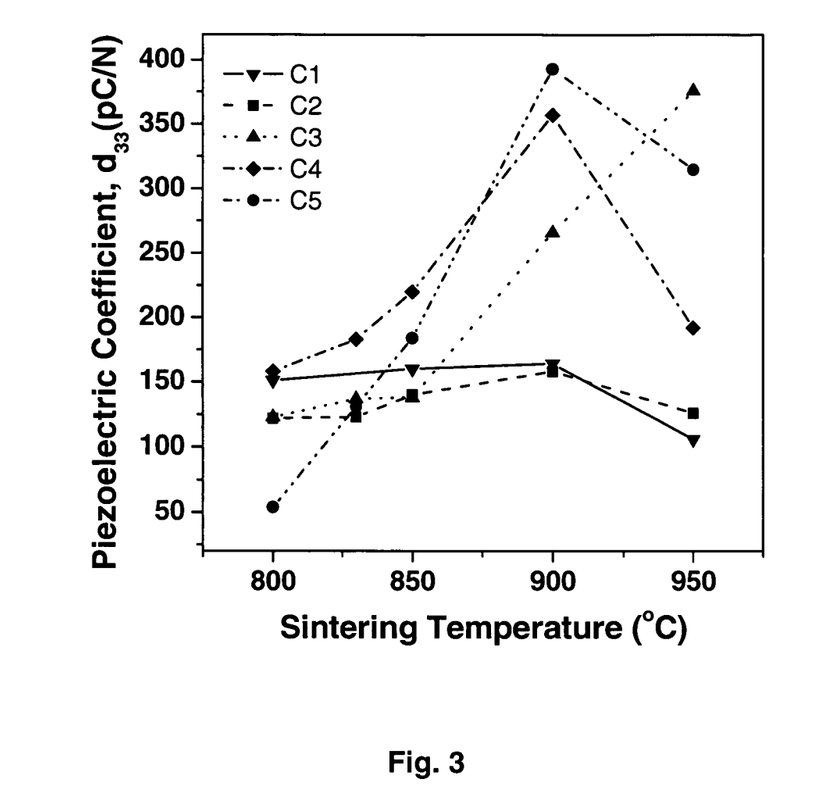
FIG. 3 is a chart showing a Piezoelectric Coefficient-Sintering Temperature curve of a test sample formed of a ferroelectric ceramic material according to one embodiment of the present invention.

As shown in Table 2,the density of C4 test sample increases from 6.87 to 7.59 g/cm³, when the sintering temperature increases from 800 to 850° C. Upon sintering at a higher temperature above 850° C., the density does not increase but slightly declines. However, the maximum dielectric constant and piezoelectric coefficient for C4 are obtained after sintering at 900° C., which are 1900 (1 kHz) and 357 pC/N (FIG. 3), respectively. The remnant polarization increases with sintering temperature until 950° C., and is 13.9 μC/cm² after sintering at 900° C. (Table 2 and FIG. 2). Temperature dependence of the dielectric constant indicates that this composition has a Curie temperature of 219° C., as shown in FIG. 4.

EXAMPLE 3

Another ceramic composition C3 as specified in Table 1 (0.30PNN-0.10PZN-0.10PMN-0.15PZ-0.35PT), may be produced through the same processing route as described in Example 1.

As shown in Table 2,the density of C3 test sample increases from 6.46 to 7.63 g/cm³ when sintering temperature increases from 800 to 850° C. Upon sintering at a higher temperature of above 850° C., the density does not increase but slightly declines. However, the maximum dielectric constant for C3 is obtained after sintering at 900° C., which is 2233 at 1 kHz. The remnant polarization and piezoelectric coefficient increase with sintering temperature until 950° C., and they are 13.6 μC/cm² and 376 pC/N, respectively, as listed in Table 2.Temperature dependence of the dielectric constant indicates that this composition has a Curie temperature of 183° C., as shown in FIG. 4.

EXAMPLE 4

Ceramic composition C2,as specified in Table 1 (0.40PNN–0.10PZN-0.10PMN-0.12PZ-0.28PT), may be produced through the same processing route as described in Example 1.As shown in Table 2,the density of C2 test sample increases to the maximum value of 7.68 g/cm³ when sintering temperature is 830° C. High dielectric constant from 2578 to 3126 is obtained in a broad processing temperature range of 800-950° C. The remnant polarization and piezoelectric coefficient are 10.0 μC/cm² (FIG. 2) and 158 pC/N (FIG. 3), respectively, for the sample sintered at 900° C. Temperature dependence of the dielectric constant indicates that this composition has a Curie temperature of 139° C., as shown in FIG. 4.

EXAMPLE 5

Ceramic composition C1,as specified in Table 1 (0.45PNN-0.10PZN-0.13PZ-0.32PT), may be produced through the same processing route as described in Example 1.As shown in Table 2,the density of C1 test sample increases to the maximum value of 7.87 g/cm³ when sintering temperature is 800° C. High dielectric constant from 2403 to 3181 is obtained in a processing temperature range of 800-950° C. The remnant polarization and piezoelectric coefficient are 10.1 μC/cm² (FIG. 2) and 164 pC/N (FIG. 3), respectively, for the sample sintered at 900° C. Temperature dependence of the dielectric constant indicates that this composition has a Curie temperature of 145° C., as shown in FIG. 4.

EXAMPLE 6

Excess oxides of valence 2 metal elements may be added to promote the sintering process and formation of the perovskite phase, according to a further embodiment of the present invention. Addition of PbO is described in Example 1. Similarly, excess MgO, NiO, and ZnO can be added for the same purpose. In Example 6,excess MgO addition is described to explain the procedure.

Composition C5-M, which is similar to C5 illustrated in Example 1 except for a small excess amount of MgO doping of 1% in mole, may be produced in a similar preparation procedure as described in Example 1 and in conjunction with FIG. 1A. An additional MgO (Kanto Chemical, 99.99%) is added in the stage of mixing the precursors with PbO, $ZrO_2$, and $TiO_2$ powders, as indicated as block 142 in FIG. 1 with a dashed line. The other processing steps and conditions are the same as those in Example 1.

Figure 5:
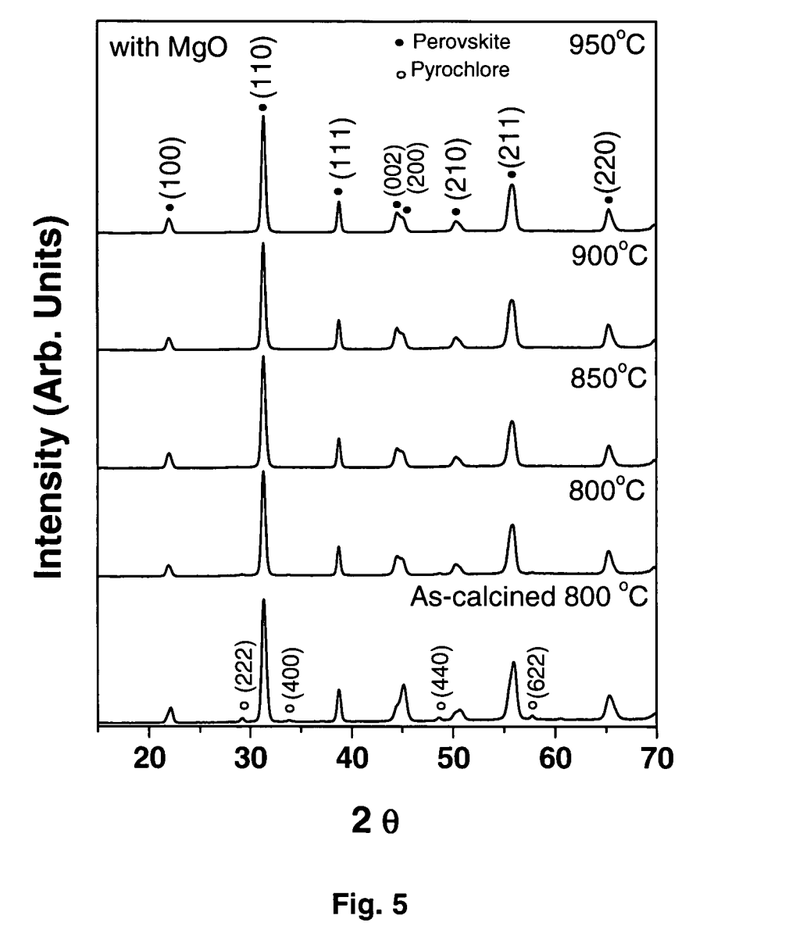
FIG. 5 is an X-Ray Diffraction pattern of a test sample formed of a ferroelectric ceramic material according to one embodiment of the present invention.

The XRD results of C5-M powders after calcine at 800° C. and test samples made of C5-M compositions after sintering at 800-950° C. are presented in FIG. 5. Perovskite phase significantly dominates over the minor pyrochlore phase in the calcined powders, and a single perovskite phase forms in the test sample after sintering at a temperature of 850° C. and above. The density of the C5-M test sample increases with increasing sintering temperature from 800-900° C., as listed in Table 3,and the peak value of 7.93 g/cm³ is obtained at a sintering temperature of 900° C. There is a slight drop in density when sintering temperature is above 950° C. Compared to C5,the addition of excess MgO promotes densification of the ceramic in the sintering temperature range of 800 to 950° C.

Figure 6:
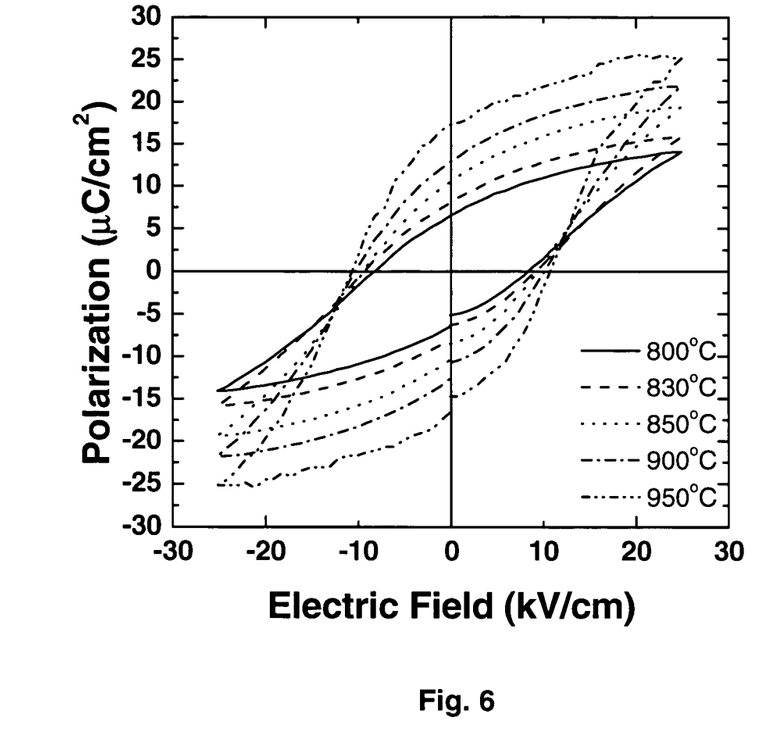
FIG. 6 is a chart showing a Polarization- Electric Field curve of a test sample formed of a ferroelectric ceramic material according to one embodiment of the present invention.
Figure 7:
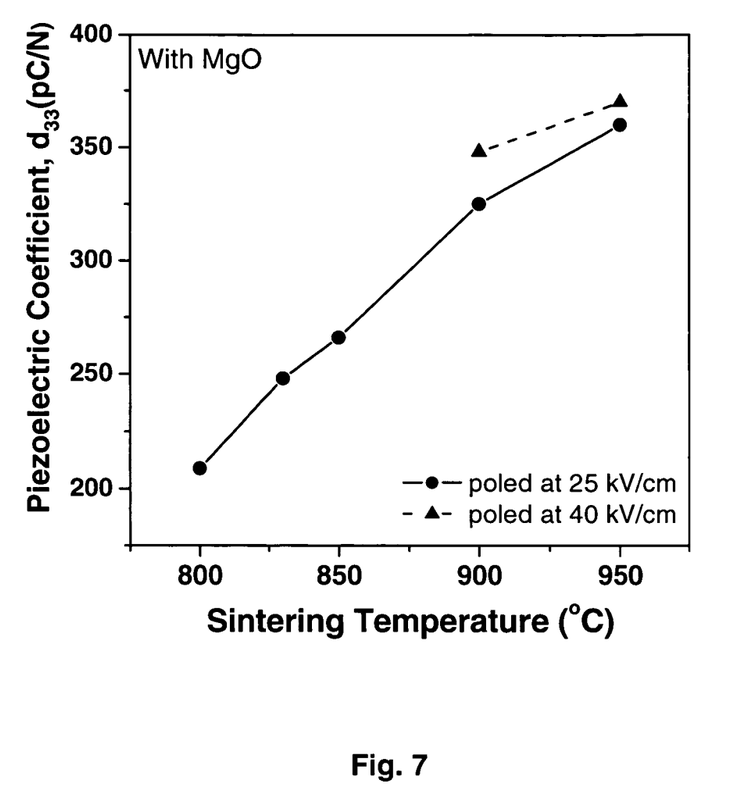
FIG. 7 is a chart showing a Piezoelectric Coefficient- Sintering Temperature curve of a test sample formed of a ferroelectric ceramic material according to one embodiment of the present invention.

According to Table 3,the dielectric constant of C5-M increases from 1938 to 2295 at 1 kHz with increasing sintering temperature from 800 to 950° C. s Compared to C5,it is believed that excess MgO addition results in enhanced dielectric constant. The temperature dependence of the dielectric constant indicates that the Curie temperature of C5-M is 200° C. The remnant polarization of C5-M increases with increasing sintering temperature, and the value is 17.2 μC/cm² when sintered at 950° C., as shown in Table 3 and FIG. 6. With excess MgO in C5-M, the remnant polarization is improved compared with C5 in Example 1.The $d_{33}$ value increases from 209 to 360 pC/N with increasing the sintering temperature from 800 to 950° C., as shown in Table 3 and FIG. 7. According to FIG. 7, increasing poling electric field from 25 to 40 kV/cm, $d_{33}$ is improved from 348 to 370 pC/N.

EXAMPLE 7

Comparative

Examples 7 is used to illustrate the effect of using columbite precursors on promoting the perovskite phase formation in C5.

In Example 7,all the single metal oxide powders including MgO, ZnO, NiO, $Nb_2O_5$, PbO, $TiO_2$, and $ZrO_2$, are directly mixed together through the same ball milling process without going through the columbite approach, followed by the same calcining and mold pressing to form pellets, and ceramic sintering procedures with what has been described in Example 1.

Figure 8:
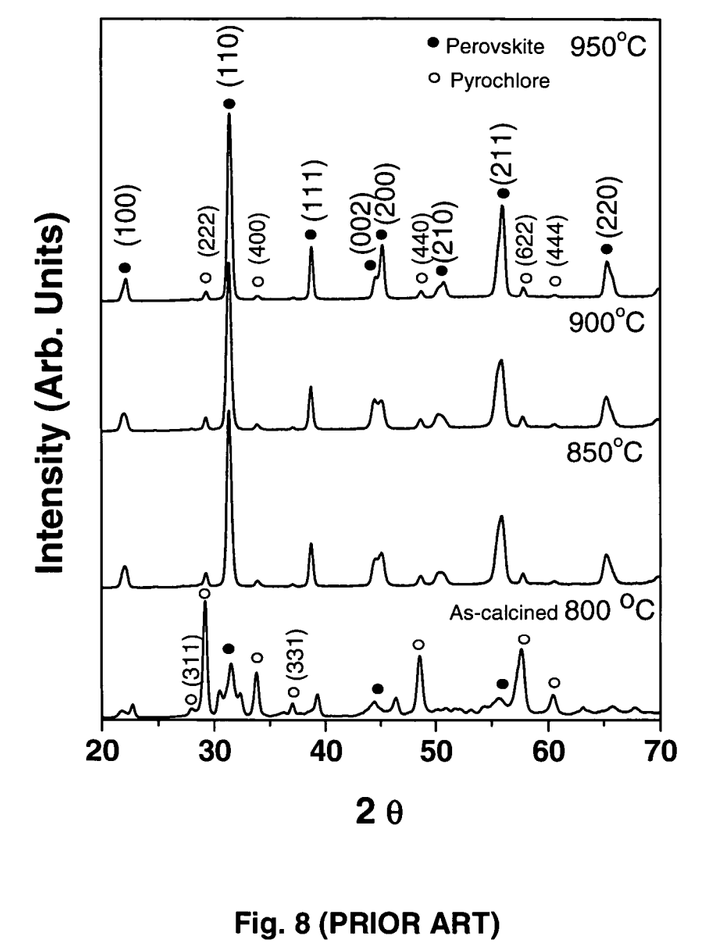
FIG. 8 is an X-Ray Diffraction pattern of a test sample formed of a ferroelectric ceramic material derived from a conventional preparation method.

FIG. 8 presents the XRD results of the samples in Example 7. After calcined at 800° C., dominant pyrochlore phase and many unreacted oxide phases are observed. Although the pyrochlore phase is significantly reduced by increasing the sintering temperature subsequently, it cannot be completely removed even when they are sintered at 950° C. Therefore, columbite approach substantially aids in suppressing the pyrochlore phase while promoting the perovskite phase in the complex ceramic compositions in this invention.

Although embodiments of the present invention have been illustrated in conjunction with the accompanying drawings and described in the foregoing detailed description, it should be appreciated that the invention is not limited to the embodiments disclosed, and is capable of numerous rearrangements, modifications, alternatives and substitutions without departing from the spirit of the invention as set forth and recited by the following claims.

The invention claimed is:

1. A ferroelectric ceramic material with perovskite phase comprising a composition represented by the formula:

$$w\text{Pb}(\text{Ni}_{1/3}\text{Nb}_{2/3})\text{O}_3\text{-}x\text{Pb}(\text{Zn}_{1/3}\text{Nb}_{2/3})\text{O}_3\text{-}y\text{Pb}(\text{Mg}_{1/3}\text{Nb}_{2/3})\text{O}_3\text{-}z\text{PbZrO}_3\text{-}(1-w-x-y-z)\text{PbTiO}_3,$$

in which
$0<w<1$, $0<x<1$, $0<y<1$, $0<z<1$, $w+x+y+z<1$, and $0.5 \leq w+x+y$, having a single crystalline phase of perovskite structure.

2. The ferroelectric ceramic material as recited in claim 1, in which
$0.1 \leq y < 1$.

3. The ferroelectric ceramic material as recited in claim 2, in which
w=0.10 to 0.45, x=0.10 to 0.35, y=0.1 to 0.15, and z=0.10 to 0.15.

4. The ferroelectric ceramic material as recited in claim 3, in which
w=0.10, x=0.35, y=0.15, and z=0.10.

5. The ferroelectric ceramic material as recited in claim 3, in which
w=0.20, x=0.20, y=0.10, and z=0.15.

6. The ferroelectric ceramic material as recited in claim 3, in which
w=0.30, x=0.10, y=0.10, and z=0.15.

7. The ferroelectric ceramic material as recited in claim 4, in which
w=0.40, x=0.10, y=0.10, and z=0.12.

8. The ferroelectric ceramic material as recited in claim 1, further including an oxide of valence 2 metal element represented by a general formula of $A^{2+}O$.

9. The ferroelectric ceramic material as recited in claim 8, in which the $A^{2+}O$ is selected from a group consisting of PbO, MgO, ZnO, NiO or combinations thereof.

10. The ferroelectric ceramic material as recited in claim 8, in which the oxide of valence 2 metal element has an amount of about 1% in mole.

11. The ferroelectric ceramic material as recited in claim 10, in which the oxide of valence 2 metal element is MgO.

* * * * *